US012423416B2

(12) United States Patent
Dawson et al.

(10) Patent No.: US 12,423,416 B2
(45) Date of Patent: Sep. 23, 2025

(54) STEALTHY PROCESS ATTACK DETECTION FOR AUTOMATED MANUFACTURING

(71) Applicant: UT-Battelle, LLC, Oak Ridge, TN (US)

(72) Inventors: Joel A. Dawson, Oak Ridge, TN (US); Srikanth B. Yoginath, Knoxville, TN (US); Michael D. Iannacone, Oak Ridge, TN (US); Varisara Tansakul, Knoxville, TN (US); Ali Passian, Knoxville, TN (US); Milton N. Ericson, Knoxville, TN (US); Gavin B. Long, Knoxville, TN (US); Robert C. Jordan, Clinton, TN (US); Joel M. Asiamah, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 152 days.

(21) Appl. No.: 18/381,735

(22) Filed: Oct. 19, 2023

(65) Prior Publication Data

US 2024/0134969 A1 Apr. 25, 2024

Related U.S. Application Data

(60) Provisional application No. 63/417,358, filed on Oct. 19, 2022.

(51) Int. Cl.
| | |
|---|---|
| *G06F 21/54* | (2013.01) |
| *B29C 64/393* | (2017.01) |
| *B33Y 50/02* | (2015.01) |
| *G06F 21/55* | (2013.01) |

(52) U.S. Cl.
CPC ............ *G06F 21/54* (2013.01); *B29C 64/393* (2017.08); *B33Y 50/02* (2014.12); *G06F 21/552* (2013.01)

(58) Field of Classification Search
None
See application file for complete search history.

(56) References Cited

U.S. PATENT DOCUMENTS

| | | | |
|---|---|---|---|
| 10,511,622 B2 | 12/2019 | Al Faruque et al. | |
| 2019/0166157 A1* | 5/2019 | Al Faruque | ......... H04L 63/1466 |
| 2019/0230113 A1* | 7/2019 | Al Faruque | ............ B33Y 99/00 |

OTHER PUBLICATIONS

Gatlin, J. et al., IEEE, "Detecting Sabotage Attacks in Additive Manufacturing Using Actuator Power Signatures", vol. 1, 2019, pp. 1-12.
Shih-Yuan Y. et al., IEEE, "Sabotage Attack Detection for Additive Manufacturing Systems", vol. 8, 2020, pp. 27218-27231.

* cited by examiner

*Primary Examiner* — William J. Goodchild
(74) *Attorney, Agent, or Firm* — Warner Norcross + Judd LLP

(57) ABSTRACT

Additive manufacturing's reliance on embedded computing renders it vulnerable to tampering through cyber-attacks. Sensor instrumentation of additive manufacturing devices allows for rigorous process and security monitoring, but also results in a massive volume of noisy data for each run. As such, in-situ, near-real-time anomaly detection is challenging. A probabilistic-model-based approach addresses this challenge.

20 Claims, 12 Drawing Sheets

```
M109 H0 S275        M109 H0 S275
M109 H1 S252        M109 H1 S252
;L:1             1  ;L:1
G0 Y9 F6800         G0 Y9 F6800
G0 X309             G0 X309
G0 Z0.1 F1200       G0 Z0.1 F1200
M104 H0 S274.5   2  ;begin section: 4
;begin section: 4   G1 E0.3334 F6000
G1 E0.3334 F6000    G0 F1200
```

*Fig. 5*

STEALTHY PROCESS ATTACK DETECTION FOR AUTOMATED MANUFACTURING

This invention was made with government support under Contract No. DE-AC05-00OR22725 awarded by the U.S. Department of Energy. The government has certain rights in the invention.

BACKGROUND OF THE INVENTION

Emerging from innovations in embedded computing, computer numerical control (CNC) technology, and polymer science, additive layer manufacturing (ALM), or 3D printing or additive manufacturing, refers both an approach to manufacturing and a category of technologies that implement this approach. Unlike traditional subtractive manufacturing or molding, ALM produces a desired geometry by progressively adding material, often layer by layer, until the final shape is realized. This approach offers several significant advantages. First, ALM allows for the fabrication of parts that are difficult or impossible to create with other techniques, including articulated or nesting designs. ALM also offers significant cost, logistical, and labor benefits for certain manufacturing use cases. By enabling on-premises, short run manufacturing, 3D printing reduces turnaround time and costs for rapid prototyping and tooling and fixture manufacturing. With the recent advent of mature composite and metal 3D printing, ALM is now being used to extend these benefits into the creation of end use parts, including parts that are being deployed in mission- or safety-critical systems.

ALM is part of a larger transition towards automated, digitized, and networked manufacturing called direct digital manufacturing (DDM), and includes devices which perform such diverse tasks as CNC milling, chemical compounding, DNA synthesis, and 3D bioprinting. The newest generation of discrete automated manufacturing devices promises to revolutionize the worlds of research, rapid prototyping, and custom or low-volume manufacturing. However, insufficient cyber security controls can allow a malicious actor to introduce harmful changes to a product by altering a design file, changing device commands while they are in transit, or tampering with a device's firmware. Because of recent attempts to incorporate automated manufacturing into safety-critical systems, including transportation, healthcare, energy, and infrastructure products, these attacks can have dire consequences.

Current-generation quality control methods, such as X-ray imaging, non-destructive stress testing, sequencing, and chemical assays, can detect these alterations in some cases, but they are often costly, time-consuming, error-prone, and require manual labor. A malicious attacker can avoid these checks with carefully tailored alterations to the original product, which threatens the integrity of these increasingly critical products. Next-generation quality control techniques, while offering high-resolution sensor measurements and automated analysis, are not designed with a human adversary in mind and therefore suffer from visibility gaps, bias in sensor placement, and training data sets where notional cyber-attacks are poorly represented. A sophisticated attacker could evade these systems with carefully crafted alterations of machine behavior.

A process verification solution is needed that monitors the machine itself and that uses data analytic algorithms that are less sensitive to adversarial machine learning and crafted input. This process verification solution can also be fast, automated, accurate, and inexpensive relative to conventional solutions.

Conventional technologies include a multimodal sabotage detection system for additive layer manufacturing (ALM) devices. This solution collects data from multiple sensor types in parallel, e.g., acoustic, vibration, current, etc., then uses a statistical model to infer the G-Code instruction that the device is running. If the predicted instruction diverges significantly from the actual instruction, an alert is raised.

Other conventional technologies include an ALM build process profiling algorithm that produces a frequency-based "signature" of normal machine behavior for a specific manufacturing run. This signature is intended to be highly portable and simple to use. It partitions electrical current data into equal size windows, computes a Fast Fourier Transform on each, finds the dominant frequency of each FFT, and appends that result to the end of the signature chain. The result is a vector that represents expected, interval-by-interval frequency behavior for an actuator in a 3D printer. To implement real-time anomaly detection, a monitoring system reproduces the same data transform for identically sized windows, then compare the dominant frequency for each window to the corresponding window in the signature. If the difference between the two is sufficiently large, an alarm is raised.

By way of background, additive layer manufacturing (i.e., ALM, 3D Printing, or additive manufacturing) workflows begin by transforming a digital representation of an object, often a CAD file, into a series of digitally encoded discrete actuator instructions. These instructions are sent to the ALM device, which interprets them locally and "executes" them as a series of actuator operations, which manufacture the product. This workflow model promotes repeatability and quality control and allows for the easy transfer of workflow files to widely distributed users. However, this integration of IT into manufacturing introduces substantial cyber-security risk.

The recent emphasis on 3D printing as a source of end-use parts, including parts for safety-critical systems, incentivizes investigation of security defenses against tampering attacks by remote adversaries, such as the system of the present disclosure. ALM devices exert enormous control over the final disposition of the item being printed. Small changes in actuator behavior can significantly alter the mechanical, chemical, and thermal properties of the final part in a deterministic way. A savvy remote attacker can stealthily tamper with the build process in a manner that causes a targeted, predictable decrease in part performance. This "deoptimization" attack can cause a part to fail at a moment of critical stress, leading to property damage or loss of life.

In response to this threat, a defense-in-depth approach has been suggested. Existing IT cyber security technologies would help secure the transfer, operation, and storage of digital data and instructions, while process monitoring with analog sensors would provide a "ground truth" data source for real-time anomaly detection and post-attack forensics. This line of inquiry compliments research efforts to detect known stochastic fault types with analog sensing for quality control. While the two threads are similar, QC fault characterization benefits from large quantities of preexisting labeled data; cyber-attacks are, by design, novel. As such, attack detection research struggles to adapt the insights of fault detection to its own purposes.

On top of this, real-time anomaly detection in an ALM context is fundamentally difficult. Each device features multiple sources of noise, and the data volumes required to detect meaningful deviations in real-time poses a substantial big-data challenge to on-premises or cloud-based computation resources. The present disclosure addresses this challenge with a probabilistic approach to real-time data analysis that is computationally tractable and accurate.

SUMMARY OF THE INVENTION

The present disclosure provides a system and method for detecting stealth additive manufacturing attacks altering g-code instructions during additive manufacturing. One aspect of the disclosure involves training a probabilistic model for use in the detection.

The method for detecting stealth additive manufacturing attacks includes providing additive manufacturing equipment and a stealth attack detection system. The additive manufacturing equipment includes a controller for controlling operation and at least one driver for controlling operation of an additive manufacturing component, for example a heating block or a motor associated with the printhead or printbed. A Hall effect sensor (or other suitable sensor) is clamped on to, at one end, a lead between the driver and the additive manufacturing component and, at the other end, the stealth attack detection system. The method includes receiving, at the stealth attack detection system, an operation current signal indicative of operational additive manufacturing instructions provided by the controller to the additive manufacturing component and predicting, based on a trained probabilistic attack detection model, whether the new instructions are unaltered or altered.

One aspect of the present disclosure involves training the probabilistic attack detection model. This includes collecting, in the stealth attack detection system, current data signals indicative of instructions provided by the controller to the additive manufacturing component based on a toolpath source. Some subsets of the collected current signals correspond to unaltered instructions and some subsets of the collected current signals correspond to instructions altered by malicious changes to the toolpath source. The training continues by determining respective phase signals from the current signals of the subsets, and determining phase synchrony metrics between the phase signals in a pair-wise manner, and associating, based on the phase synchrony metrics, a first class of signals with unaltered instructions and a second class of signals with altered instructions. Then, the training is conducted based on the determined phase synchrony metrics between the phase signals retrieved from the current signals indicative of instructions to the additive manufacturing component to generate a Bayesian probabilistic model of logistic regression to define the boundary between the first class and the second class.

Another aspect of the present disclosure relates to memory encoding instructions that, when executed by a data processing apparatus, cause the data processing apparatus to perform certain operations. These operations include accessing current and voltage signals indicative of instructions provided by controller circuitry of a 3D printer to actuators thereof based on a toolpath source. Some subsets of the accessed current and voltage signals correspond to unaltered instructions and some to instructions altered by malicious changes to the toolpath source. The memory also causes the data processing apparatus to retrieve respective phase signals from the current and voltage signals of the subsets and determine phase synchrony metrics between the phase signals in a pair-wise manner, and associate, based on the phase synchrony metrics, a first class of signals with unaltered instructions and a second class of signals with altered instructions.

The memory can further cause training, based on the determined phase synchrony metrics between the phase signals retrieved from the current and/or voltage signals indicative of instructions to at least some of the actuators, a Bayesian probabilistic model of logistic regression to define the boundary between the first class and the second class. Then, in response to receiving a new current or voltage signal indicative of new instructions provided by the controller circuitry to one of the actuators, the system can predict, based on the trained model, whether the new instructions are unaltered or altered.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 5 illustrates a before-and-after example of an attack for a single layer of G-Code.

DESCRIPTION OF THE CURRENT EMBODIMENT

Embodiments of the present disclosure provide 1) an easily deployable instrumentation methodology, and 2) a data modeling regime that is flexible, accurate, fast, and noise tolerant. The system focuses on measurements of the device's electrical system because power draw dynamics show a strong causal relationship with actuator behavior. Embodiments of the system's analysis algorithm are power sensor agnostic. Some embodiments focus on current because of the ease of isolating dominant frequencies from current signals.

Figure 1:
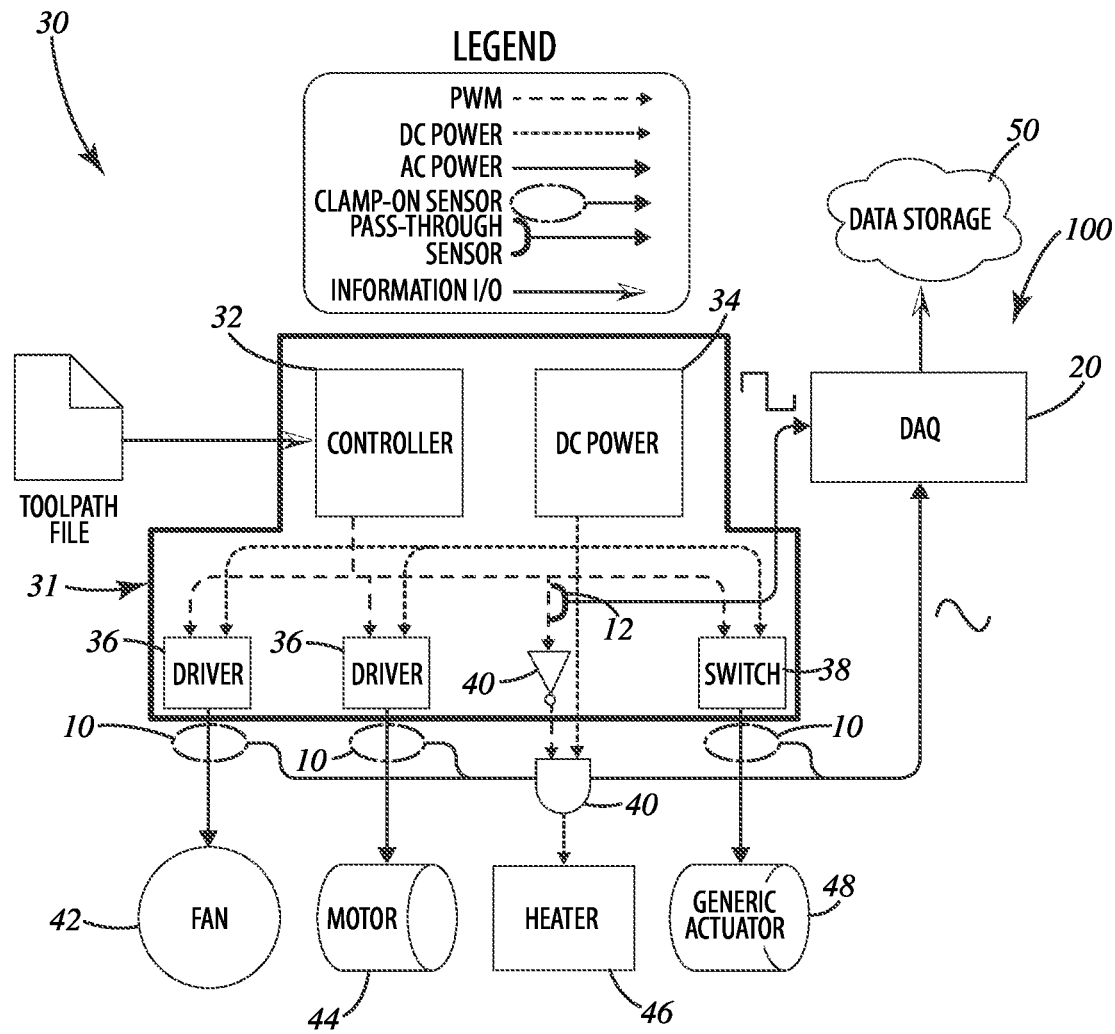
FIG. 1 shows a representative block diagram of an attack detection system that collects and processes side-channel data from a 3D printer.

For ease of deployment, in some embodiments clamp-on Hall effect sensors or current transducers can be attached to the negative or positive leads for each actuator. FIG. 1 shows a representative block diagram of one embodiment of the stealth attack detection system 100 for an automated manufacturing system 30 that include a general instrumentation configuration.

The automated manufacturing system 30 can be an additive manufacturing system that generally includes a control system 31 that includes a controller 32, DC power source 34, and one or more drivers 36, switches 38, and other logic circuitry 40. These components operate to control one or more automated manufacturing (e.g., additive manufacturing) components, such as a fan 42, motor 44, heater 46, and/or other generic actuator 48.

The stealth attack detection system 100 generally includes sensors 10/12 for the additive manufacturing system, a data acquisition device (DAQ) 20, and a storage system 50. In the depicted embodiment, clamp-on 10 or pass-through sensors 12 collect current and/or voltage signals at an external data acquisition device (DAQ) 20. This data can be collected in a multichannel data logger and can be stored on a monitoring computer or other storage device 50 local or remote to the additive manufacturing system.

To start the analysis, each data collection can be portioned by the stealth attack detection system into a series of equal-sized windows, then the data can be decimated in each with a low-pass or band-pass filter. The system can then be programmed to calculate the instantaneous phase for all data points in each window by applying the Hilbert Transform and retrieving the phase angle. The system takes two windows for comparison and calculates the phase synchrony between the two, which produces a vector of values between the range of 0 and 1 which measure the instantaneous phase alignment of the two signals. "1" indicates complete synchrony and "0" indicates none.

The system averages the contents of each synchrony vector and uses the resulting value as the input to a probabilistic model. Data collection can be broken down into two classes: "baseline" behavior that represents normal machine operation, and "attack" behavior that exhibits unacceptable levels of deviation from the norm. While exact attack simulations are difficult to produce, device performance expectations can be used to define maximum acceptable deviation distances. Once these two bodies of data have been collected, the system can calculate "baseline-baseline" and "baseline-attack" phase synchrony comparison values. These values can constitute a training data set.

A logistic function $\theta(x)=1/(1+e^{\alpha+\beta x})$ can be used to define the boundary between the two classes. To perform classification, the mean x value of a phase difference signal is plotted in the classifier's range between 0 and 1; its location in relation to the logistic curve on that range determines its predicted class. The curve's shape is determined by the variables $\alpha$ and $\beta$, which represent its lateral shift and slope, respectively. The variables $\alpha$ and $\beta$ can be trained with the Monte Carlo Markov Chain (MCMC) method by generating Bernoulli distributions for each from the training data set. This training reconstructs the posterior distributions of each variable and represents the basis for a Bayesian classifier.

Once the Bayesian classifier is trained, the attack detection system can be used to perform real-time anomaly detection. Using the posterior distributions, the system determines the probability of whether a given phase synchrony input x represents phase synchrony or asynchrony. If the predicted probability is greater than or equal to 0.5 (or another threshold/limit), the system considers it to represent phase synchrony, while the others are classified as phase asynchronous. In the context of a direct digital manufacturing (DDM) application, phase synchrony represents no process variation and asynchrony represents significant variation in the process. If variation over the set limit is detected, an alert is raised, and the score is sent to the monitoring computer as a "confidence score", which can be analyzed by a user.

Figure 2:
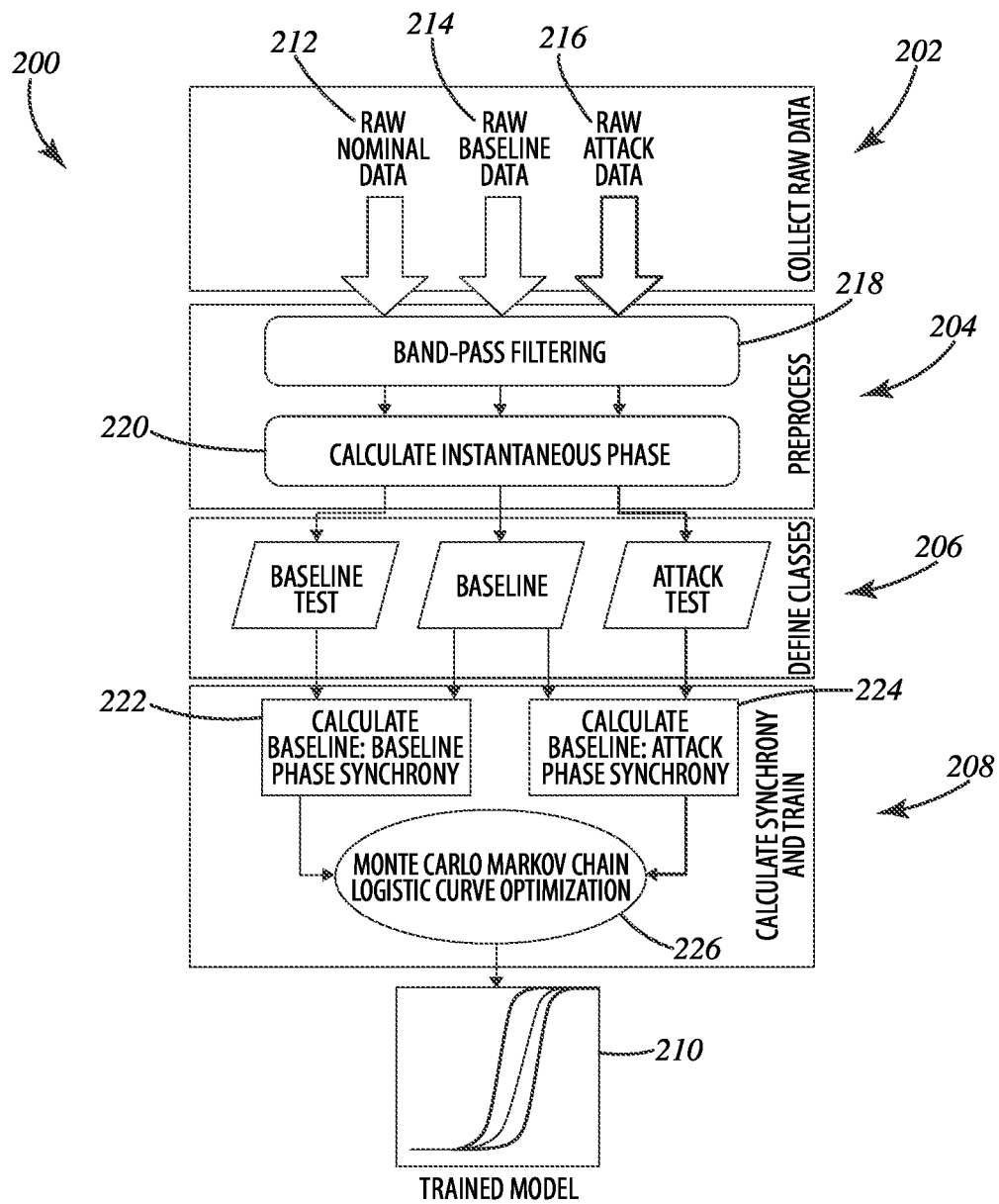
FIG. 2 illustrates an exemplary method of training a probabilistic model for additive layer manufacturing attack detection for use with the attack detection system of the present disclosure.

FIG. 2 shows a representative diagram of a training process 200 for a stealth attack detection data analysis algorithm. The algorithm can generally be broken down into four phases: 1) collection of raw data 202; 2) preprocessing 204; 3) class definition 206; and 4) synchrony calculation and training 208. Ultimately, the process 200 produces a trained stealth attack detection model 210 for an automated manufacturing system. The collection of raw data 202 can include collecting raw nominal data 212, raw baseline data 214, and raw attack data 216. The data 212, 214, 216 can be filtered with a band-pass filter 218 and then an instantaneous phase can be calculated 220 for each data set.

That is, instantaneous phase can be calculated from filtered data, which is used to define the phase behavior of the three data partitions. Next, the process defines baseline and attack classes 206 by comparing baseline data to known-good (baseline:baseline phase synchrony) 222 and known-attack (baseline:attack phase synchrony) 224 data, respectively. Finally, Monte Carlo Markov Chain distribution optimization 226 is run to optimize the shape of the Bernoulli curve that separates the two classes.

In contrast to conventional multimodal sensing technologies, the stealthy attack detection system of the present disclosure does not require multimodal sensing, and can thus be deployed quickly and inexpensively. Further, because the present disclosure utilizes current measurements, it is more tolerant of hardware changes, different actuator types, and changing environmental elements.

In contrast to conventional ALM build process profiling algorithms, the present disclosure is based on instantaneous phase, so no tradeoff between frequency- and time-domain fidelity is required when choosing window size. Further, the system of the present disclosure utilizes a logistic curve to implement Bernoulli distributions, which provides a probabilistic "confidence score" when two windows are compared, which is useful telemetry for a user.

Embodiments of the system of the present disclose compare favorably with existing DDM side-channel process tampering systems in terms of accuracy, speed, cost, and explainability.

Generally, systems of the present disclosure can be used in a variety of different fields that utilize additive manufacturing, such as security and defense, and/or manufacturing generally. The system can be used in cyber-anomaly detection system for existing systems. That is, implementations of the present embodiment can be used to retrofit existing devices, and then supply analysis results in a commercial security information and event management (SIEM) product. Further, the system can be used in integrated cyber-anomaly detection systems. That is, instead of being retrofit, in some embodiments, the system can be integrated into the additive manufacturing machine. Model training can be provided through an embedded coprocessor, or training can be offloaded to an outside system via a serial or network connection. Furthermore, the system of the present disclosure can be used in data sources for machine maintenance prediction analytics. The data can be packaged in a common format and provided for analysis to a third-party software system to predict actuator health and plan maintenance intervals.

Because ALM devices are increasingly being used to manufacture end-use parts, a data pathway to provide both a real-time "ground truth" of machine state as well as a source for post-attack forensics is helpful. Side-channel process monitoring uses analog sensors, e.g., acoustic, power, vibration, etc., to capture signals that describe a machine's behavior over time. These signals are then used to train a model of nominal device behavior, which is used for real-time anomaly detection.

Side-channel emissions are exceptionally difficult to spoof, so this line of inquiry has generated notable interest and encouraging results. Of particular interest is the "signature" approach, which creates a behavior model for each discrete process. This has the advantage of treating the ALM device like a black box, but the disadvantage of requiring baseline data collection for each new production run. Studies have investigated acoustic, power, and visual sensors under this paradigm, as well as multisensor setups.

While the state of "signature"-based technologies is promising, there are potential gaps. For instance, most side-channel research uses relatively coarse-grained, "noisy" attacks, which casts doubt on the usefulness of these algorithms and data sources when faced with a sophisticated adversary, where stealth would be prioritized. Defined simply, a successful stealthy sabotage attack would induce changes that can 1) successfully degrade the manufactured part in an intended way, and 2) evade detection by process sensors. Sensor evasion can be accomplished either by inducing changes in a sensor "blind spot" or by creating changes that a process monitoring system would misclassify or interpret as noise. Because of the sensitivity of certain feedstock materials to very small changes in an ALM process, the risk of these stealth attacks is acute. Literature has investigated the challenges of designing, implementing, and characterizing ALM sabotage attacks that meet the definition of a stealth attack. Recently, researchers implemented a series of stealth attacks on print infill by tampering with the filament extrusion rate and heat block temperature of a fused deposition modeling 3D printer. Corresponding experiments showed that the attacks, while inducing no visible changes, produced notable deviations from baseline in the printed part's overall strength, stress-strain behavior, and failure speed.

While attack modeling for ALM security is still evolving, it can be helpful to understand deployment, presentation, and detection of stealth attacks, particularly for enterprise or industrial contexts, where attacks can be more consequential. Another gap is the relative neglect of probabilistic models. Intuitively, actuators can be mathematically modeled with a deterministic and nondeterministic component. Using probabilistic analysis herein, the system of the present disclosure can define and bound a "noise term" in a way that is useful to an end user, e.g., providing a classification "confidence score".

The present disclosure is generally directed to Bayesian classifier, which is trained with multichannel current data from an instrumented multimaterial composite printer. The efficacy and efficiency of a Bayesian-based model are discussed when presented with a noisy, real-world-comparable test environment, and when faced with simulated stealthy tampering attacks. The attacks are intended to simulate realistic attack types. A first attack type, which can be referred to as a "creep attack", adds small per-layer deviations to a temperature parameter that dictates a melting temperature of a testbed's feedstocks. A second attack type is a malicious change to a single Z-axis advance command in the second layer of a print. Collected data from these attacks can be labeled and used to test the sensitivity of the system's model to class labels. Further, the efficacy of a single feature across multiple data channels will be discussed. The system of the present disclosure can address the challenges involved in side-channel analysis, which include data collection, processing, and storage, feature selection, model definition, and best practices for detecting novel attacks.

Multi Material Printer

Further details will now be provided for an exemplary stealthy attack detection system 300 in connection with FIGS. 3-10. The system of the present disclosure utilizes an enterprise-grade multi-material 3D printer 302. This 3D printer provides a complex signals environment, with electronics and actuators that operate at high frequencies and power and a complete operational workflow from CAD file to printed object.

Figure 3:
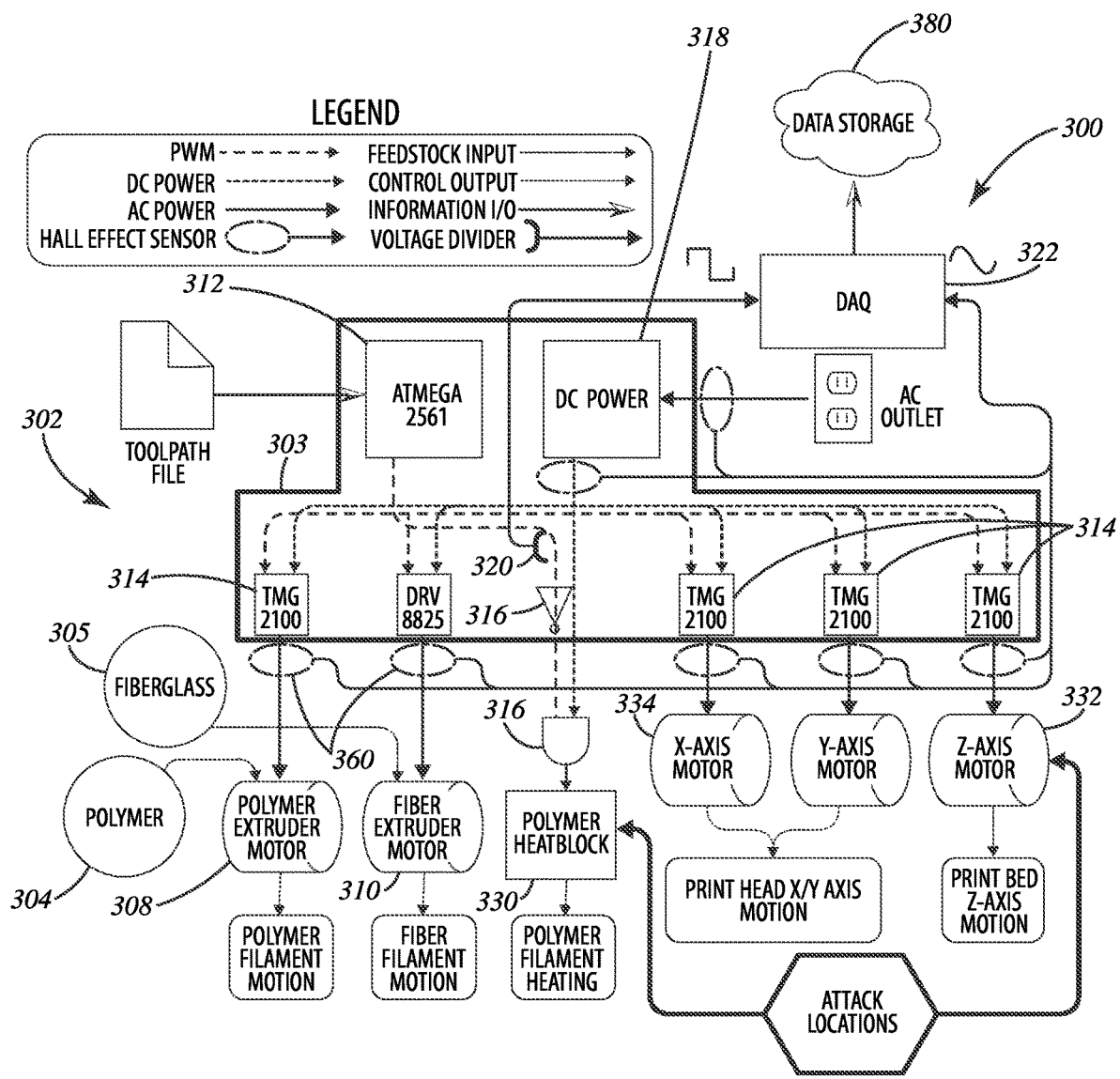
FIG. 3 a representative block diagram of an attack detection system including an attack detection system configured to collect and process side-channel data from a multi-material 3D printer.

The 3D printer 302 is a desktop fused deposition modeling printer that provides two parallel material deposition lines. The first line lays down a polymer 304 that is delivered through a conventional filament being operated by a polymer extruder motor 308, while the second can lay down a variety of continuous fibers. For example, as depicted in FIG. 3, the second line can be fiberglass 305, that is extruded by a fiber extruder motor 310. By interleaving layers from these two lines during manufacturing, the printer 302 can fabricate fiber-reinforced polymer parts that have, e.g., in some directions, a superior strength-to-weight ratio when compared to conventional polymer parts.

As shown in FIG. 3, the 3D printer has a control system 303 that includes a microcontroller 312, in this case an Atmel 2561 8-bit microcontroller, which receives and parses G-Code toolpath instructions, then translates these instructions into pulse width modulation (PWM) control signals for each dependent actuator.

Motor driver chips 314 interpret these signals into micro stepping pulses, while switching MOSFETs 316 allow for direct control of the heater cartridges on the printhead. The printer can be powered by a 24V switching power supply 318. Table 1 summarizes exemplary components, their use case, and classifications of the 3D printer components.

TABLE 1

| Component | Use | Class |
|---|---|---|
| NEMA 17 stepper | X, Y, Z axes, polymer extruder | actuator |
| NEMA 11 stepper | fiber extruder | actuator |
| Micro servo | fiber cutter | actuator |
| 12 V heater cartridge | Polymer, nylon heat source | actuator |
| Atmel 2561 | 8-bit MCU | controller |
| Trinamic 2100 | bipolar stepper driver | motor control |
| TI DRV8825 | bipolar stepper driver | motor control |
| DMN6040SS | switching MOSFET | heater control |
| MeanWell LRS-150 | 24 V AC/DC converter | power supply |

Electrical Signal Instrumentation

The stealthy attack detection system 300 of the current embodiment utilizes current measurements for its primary data source. For example, such current measurement data can be collected with Magnelab HCT-0010-005 clamp-on Hall-effect sensors 360 or other suitable current measurement sensors. The signals can be digitized, for example at 16-bit resolution by a National Instruments USB-6346 DAQ at 10 kS/sec or other suitable digitizing equipment.

In the current embodiment, the attack detection system 300 collects a voltage signal from the pulse-width modulation (PWM) signal to the polymer heater MOSFET 316, due to difficulties of collecting current data from the printhead control terminal. In this embodiment, a pass-through voltage sensor 320 soldered to the MOSFET chip 316 provides a voltage level to the DAQ 322, which reads it with an internal voltage divider. Just as described in connection with the embodiment of FIG. 1, the collected data can be stored in a local or remote data storage device 380.

MMP Side Channel Data

FIG. 3 shows the placement of the sensors. During operation, in the current embodiment, a Python script samples from eight channels simultaneously and stores the data as separate columns in HDF5 files. The noted data channels and units are listed in Table 2.

TABLE 2

| Channel | Units | Sensor |
|---|---|---|
| Y-axis stepper | Amperes | Hall effect |
| X-axis stepper | Amperes | Hall effect |
| Polymer extruder stepper | Amperes | Hall effect |
| Fiber extruder stepper | Amperes | Hall effect |
| Polymer heatblock PWM | Volts | Voltage divider |
| Z-axis stepper | Amperes | Hall effect |
| 24 V DC power supply | Amperes | Hall effect |
| 120 V mains power | Amperes | Hall effect |

MMP Attack Detection Model

Anomaly detection can begin on the 3D printer 302 by first collecting side-channel data for the uncompromised or known-good signals and the compromised or known-bad signals. A subset of known-good and known-bad signals can be used to compute a body of good:good and good:bad signals comparisons, which can be used to train the model. The rest of the held-out signals can be utilized to validate model accuracy.

Preprocessing

Referring back to FIG. 2, calculation and testing of the instantaneous phase 220 will now be discussed in more detail. A point-value mean of the instantaneous phase difference distribution between a known-good signal and a test signal can be used to produce a single data point, which can be used for training, model validation, or detection.

Instantaneous Phase Angle

Let $S_1$ and $S_2$ be the two input signals. To obtain the phase difference signal, the system can apply a Hilbert transform to the input signals $S_1$ and $S_2$. The Hilbert transform imparts a phase shift of 90 degrees to every frequency component of an input signal. After this shift, the instantaneous phase angle at every point of the input signals can be represented as $H_{S_1a}=\mathrm{angle}(H(S_1))$ and $H_{S_2a}=\mathrm{angle}(H(S_2))$, where $H(\ )$ represents the Hilbert transform function. Then, the system can calculate the phase synchrony $P_S$ between the two input signals, which yields:

$$P_S(H_{S_1a}, H_{S_2a}) = 1 - \sin(|H_{S_1a} - H_{S_2a}|/2.0) \quad (1)$$

Thus, if the input signals are phase synchronous, $P_S$ will be 1.0 for all points. However, due to the presence of noise, phase synchrony comparisons of in-phase empirical data in the same class typically yield distributions with their mean heavily right shifted towards 1.0. As such, taking the point-wise mean produces values that are consistently near 1.0.

Practically, further improvements to the synchrony comparisons can be made because the instantaneous phase angle calculated for any signal corresponds to the dominant frequency at that time instance. By applying a low-pass filter and cross-correlating, a closer match between the signals' phase angles can be ensured.

Data Volume

Because each test print can produce over 100 million data points per channel, and the data can be very noisy, computation can be expensive, and the analysis results can suffer. Downsampling and smoothing the inputs $S_1$ and $S_2$ with an anti-aliasing finite impulse response (FIR) filter can reduce the computational costs.

Time Synchronization of Input Signals

To produce a meaningful phase synchrony comparison, $S_1$ and $S_2$ can be time synchronized. In the current embodiment, this is accomplished through a two-step process. First, a start point feature is determined that is consistent across a set of test prints. A point in the Y-axis signal is identified, where, after the dual heat blocks have reached their operating temperatures, the Y-motor begins a brief filament purge, which creates a distinct "spike" in the data. Because all channels are collected simultaneously, the offset for the Y-channel can be calculated and applied to all the side-channel signals used for analysis. This ensures that all signals have a common start point.

In the second step, cross correlation can be used to fine tune signal synchronization. That is, the signal synchronization can be fine-tuned by incrementally shifting one input signal and computing cross correlation between the $S_1$ and $S_2$ after every shift. After repeating this process within a specified time window, the highest cross-correlation value can be used to define a time lag, which can be used to shift one of the signals in time. Then, both signals can be truncated to maintain a constant length.

Bayesian Model

Embodiments of the present disclosure can use a logistical regression model for classification. In the current embodiment, a Bayesian probabilistic model of logistic regression is utilized because it can estimate uncertainty among variable data sets. The data being classified is the point-wise arithmetic mean of each phase synchrony measurement. The system calculates phase synchrony between two known-good signals and between a known-good and known-bad, e.g., compromised, signal and labels them accordingly. To train the Bayesian model, a Markov Chain Monte Carlo random sampling algorithm optimizes the shape of the logistic curve.

The trained Bayesian model can classify between synchronous (SYNC) and asynchronous (ASYNC) phase. A single independent variable or feature, for example a side-channel signal that is intricately involved for the whole length of the printing process, is sufficient to obtain meaningful results. Categorical values for SYNC, which represents no change in the compared signals, and ASYNC, which represents significant change in the compared signals, can be encoded as "1" and "0", respectively.

Using regression, the mean can be estimated as $\theta = f(\alpha + \beta x)$ for any input feature x. A logistic function $1/(1+e^\mu)$ as $f$ can be used for classification. If $\mu = \alpha + \beta x$, then the output of the logistic function:

$$\theta = \frac{1}{1 + e^{\alpha + \beta x}} \quad (2)$$

can be categorical, where values of $\theta$ greater than the mean 0.5 take a value of 1 (SYNC) and less than 0.5 take a value of 0 (ASYNC). The Bayesian model can start with a normal distribution for the $\alpha$ and $\beta$ variables. Using each datum in the feature set as an input to the logistic function and a Bernoulli distribution, a probabilistic estimation of the category to which an input feature belongs can be obtained. To train, a specified training set and the No U-Turn MCMC sampler (NUTS) can be used to obtain posterior distributions of the $\alpha$ and $\beta$ variables. Once training is complete, these distributions can be used to probabilistically predict the category, e.g., SYNC or ASYNC, of the input feature, which is the mean value of a phase synchrony calculation between a representative known-good current measurement and a current measurement to be tested. Algorithm 1 in Table 3 below shows this Bayesian model employed for training and inference.

TABLE 3

Algorithm 1: Bayesian Logistic Regression Model

| Parameters: | $x_i$ | input feature |
| | $y_i$ | input category (training only) |
| | $y_{pred}$ | output category |
| | $\alpha$ | regression bias parameter |
| | $\beta$ | regression slope parameter |
| | N | Prior Normal distribution ($\mu$, $\sigma$) |
| | $\theta$ | output of the logistic function |

1 $\alpha \sim N(\mu_\alpha, \sigma_\alpha)$
2 $\beta \sim N(\mu_\beta, \sigma_\beta)$
3 $\theta \sim \text{logistic}(\alpha + x_i \beta)$
4 $y_{pred} \sim \text{Bernoulli}(\theta, \text{observed} = y_i)$ Simulated Attack Design As described previously, two sets of data can be used to build the probabilistic model, namely (a) known-good and (b) known-bad side-channel data. The known-good side-channel data can be derived from comparisons of two uncompromised 3D printing processes. The uncompromised printing process is unique and very consistent across multiple prints, except for some operational and electromagnetic (EM) noise, which reflects repeated executions of an identical toolpath. The known-bad set of data can be derived from comparisons between uncompromised and compromised printing process data traces. Unlike the uncompromised printing process, which is unique given a known-good set of toolpath instructions, the compromised printing process can involve a multitude of deviations, from subtle to starkly evident. While the system of the present disclosure can identify system faults that are induced by an intelligent adversary, these deviations do not exclude the appearance of random process failures.

Exemplary 3D Object

Figure 4A:
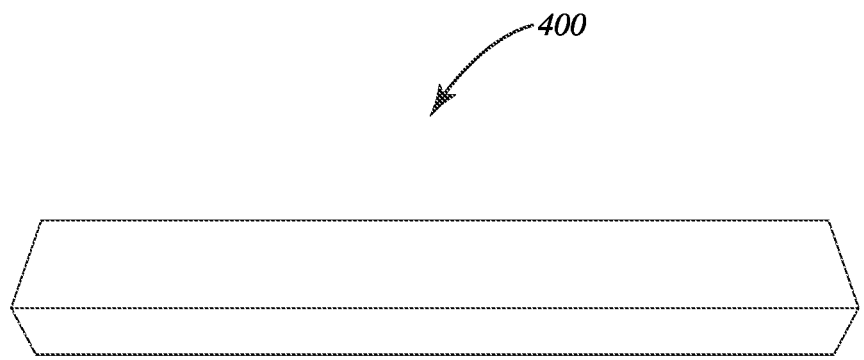
FIGS. 4A-B illustrate an exemplary 3D printed object by the multi-material 3D printer of FIG. 3.
Figure 4B:
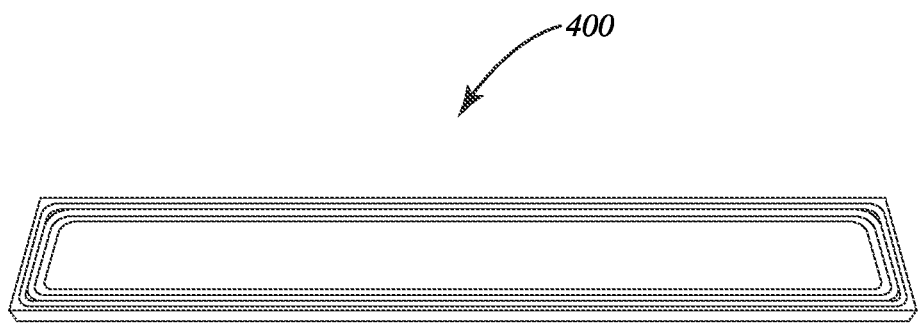

An exemplary print of a 3D object will now be described in connection with the stealthy attack detection system. An exemplary 3D printed three-dimensional rectangular prism 400 of width 15 mm, length 100 mm, and height 8 mm is illustrated in FIG. 4A. FIG. 4B illustrates a sectional view of the prism 400. The prism can be modeled with Fusion 360 (or another modeling program) and then sliced with 3D printer slicing software. The resultant G-Code file includes eighty total layers and requires approximately 3.75 hours to print for a particular 3D printer. The forty layers of the print can be reinforced with continuous fiberglass filament in two discrete bands, from layers 10 to 30, and again from layers 50 to 70, perhaps best shown in the sectional view of FIG. 4B. This greatly increases the stiffness of the part, while also providing examples of transitions between reinforced and non-reinforced layers.

Each print generates over 100 million data points for each side channel. In this example to demonstrate operation of the stealthy attack detection system, the sample rate and features are left unchanged for the uncompromised and compromised sample printing processes.

Attack Design and Description

In order to demonstrate and explain operation of the stealth attack detection system, several attack designs are described herein.

One attack type is one that accumulates small deviations over time. These "creep attacks" induce large aggregate changes in process parameters, and thus represent a threat to a part's integrity, while creating instantaneous change that is difficult to consistently detect with side-channel analysis. Creep attacks can be used to defeat stateless anomaly detection for industrial control systems.

Given access to a print's GCode, creep attacks are easy to implement programmatically. A notional threat actor achieves access to the toolpath commands in the interval between model slicing and the execution of the commands by the printer. Once access has been achieved, a regex routine can identify locations in the GCode file, e.g., or command stream, where commands need to be inserted, deleted, or altered. Because these attacks are computationally lightweight and algorithmically simple, an attacker could implement them in a variety of locations, including the printer's firmware, a low-powered device for Man-In-The-Middle network attacks, or a malicious slicer plugin.

The specific exemplary creep attack described herein is a progressive temperature attack against the polymer heat cartridge in the polymer heatblock 330, which melts the polymer matrix filament prior to deposition. During normal operation, an internal temperature parameter is set with a single G-Code command, which the printer maintains with a proportional-integral-derivative (PID) controller, a temperature sensor, and a pulse-width modulation (PWM) control signal output. This attack makes small, layer-by-layer changes to the temperature set point through malicious G-Code insertions, thus raising or lowering the temperature during the print.

FIG. 5 shows a before-and-after example of this attack for a single layer of G-Code. In this example of a temperature attack in a static G-Code file, the altered code is on the left and the original, unaltered code, is on the right. Box 1 shows the layer delimiter, while Box 2 shows the injected command that decrements the temperature by 0.5° C.

To demonstrate the effects of this attack, several attack variations, with progressively smaller layer-by-layer temperature changes can be performed. Because the temperature values in this instance are limited by the firmware, the change iterator reciprocated between the minimum and maximum allowable values, e.g., 265° C. and 285° C., respectively. Other attacks that oscillate between the maximum and minimum temperatures after every layer, as well as an attack that produced a single, sustained temperature drop in the middle of the print are other possible variations.

Another attack type is a "point" attack, where a single GCode command is maliciously altered. Point attacks differ from creep attacks in that both their instantaneous and aggregate change are small, and thus hard to detect even with stateful monitoring. However, point attacks must be placed carefully to yield the desired effect. To reflect this, the Z-axis motor 332, which controls the print bed z-axis motion is attacked in this exemplary simulation. The attack targets the layer transition movement between the first and second layers of the print. During normal operation, each Z-axis movement is precisely defined in the G-Code with an axis identifier and a float value that defines angular rotation distance of the Z-axis motor. Unlike the heater cartridge, Z-axis control is completely open loop. This attack is performed by making a small, fixed-size addition to the targeted Z-axis movement command. Table 4 lists all the attack data collection classes, including their associated actuator and per-layer change.

Due to the volume of data involved in the collection, noise can present a significant issue. Accordingly, one challenge with attack detection system lies in handling the noise such that the subtle deviations in phase are not lost. To address this, many embodiments of the attack detection system of the present disclosure focus on single features, e.g., single data channels, with a Bayesian logistic regression model, which can evaluate each side-channel individually. Other embodiments can utilize a multi-feature logistic regression model, for example to capture and analyze X, Y and Z motor readings.

Hardware and Software

Different test platforms can be used to perform model training and inference and to evaluate the performance of the attack detection. One test platform (Test Platform 1) is a standalone workstation with an Intel® Xeon® W-2245 processor with 8 cores and 16 hyper threads, performing at a base frequency of 3.9 GHz, a main memory of 128 GB, and an 8 TB hard drive. Another test platform (Test Platform 2) is a server with two AMD EPYC 7742 64-Core processors, which provides a total of 256 simultaneous multi-threads, and has a main memory of 1 TB and NVMe SSD drives. The software for the current embodiment is Python-based and predominantly utilizes the PYMC3, Numpy, sklearn, pandas, Scipy and h5py modules. However, alternative embodiments can utilize different programming languages and modules. The current embodiment software also uses the asyncio, multiprocessing, and concurrent libraries to enhance the compute performance.

Model Training to Obtain Posterior Distributions

To train the attack detection model with a single feature, e.g., data pertaining to the X-axis, etc., the data is first

TABLE 4

| Attack Label | Sample Count | Actuator | Type | Description |
| --- | --- | --- | --- | --- |
| Sawdown-polymer | 11 | polymer beat block | temperature slope | ±20° C. change/layer |
| Sawdown-fiber | 7 | fiber heat block | temperature slope | ±20° C. change/layer |
| Singledrop | 5 | polymer heat block | temperature drop | 10° C. drop for 20 layers |
| Longsaw10 | 5 | polymer heat block | temperature slope | ±2° C. change/layer |
| Longsaw20 | 5 | polymer beat block | temperature slope | ±1° C. change/layer |
| Longsaw40 | 4 | polymer heat block | temperature slope | ±0.5° C. change/layer |
| Slopedown | 5 | polymer heat block | temperature slope | ±0.25° C. change/layer |
| Z-Inc-5 | 5 | Z-axis motor | Z-increment | +0.05 mm increase on 2nd layer |
| Z-Inc-6 | 6 | Z-axis motor | Z-increment | +0.06 mm increase on 2nd layer |
| Z-Inc-7 | 5 | Z-axis motor | Z-increment | +0.07 mm increase on 2nd layer |

Besides stealthiness, both exemplary attacks are chosen to compromise the flexural strength of our sample print. When force is applied perpendicularly to the orientation of a laminate composite's reinforcement layers, the matrix's layer adhesion strength is a factor in a composite's stress and strain behavior. Because the interlayer bond strength in ALM is determined in part by the thermal profile of newly deposited material, changing that profile either directly, e.g., by modifying the melting temperature, or indirectly, e.g., by increasing the traveling distance between the heat source and the deposition surface, can produce a deleterious effect on the lamination, and by extension the flexural, strength of the part.

The immediate effects of these attacks are generally invisible to the naked eye. The finished prints present either as indistinguishable from a nominal print, or in the case of certain larger Z-axis attacks, as warping.

Attack Detection Examples

Several examples of operation of the attack detection system will now be described in detail.

preprocessed and then used to train a Bayesian model, as described in previously. To test the effectiveness of single-feature training, two signals can be used: (1) a reference signal from known-good printing operations, and (2) a labeled test signal that needs to be analyzed and verified before being classified as good or bad correctly.

Training Models and Corresponding Datasets.

Training begins with a set of files containing side-channel data corresponding to known-good and known-bad 3D printing processes. Each side-channel can be used as an input feature. As an example, consider the signals from the X-axis motor 334, which controls the print head x-axis motion. The X-axis known-bad data is the signal from the X-axis motor that is collected during a compromised print.

The data points in the training set are labeled as "1" (SYNC) to represent known-good data and "0" (ASYNC) to represent known-bad data. To overcome noise in the large dataset, the input signals $S_1$ and $S_2$ can be divided into several contiguous windows. The mean $P_{Sr}$ can be calculated individually on these regions. Then, these sub-window means can be used to compute $P_S$. Since every regional computation ensures the input signals are highly correlated before computing $P_{Sr}$, this procedure essentially reduces the propagation of error across the length of the signal data.

For these examples, two types of models are used: (1) models that are trained with data from all attack types, and (2) models that are trained with data from a single attack type.

Example 1—Training Models with All Attack Types

A single feature model can be trained where model samples from different attack categories are used in the training set. This approach is ubiquitous in various machine learning approaches.

For this exemplary model the training set was developed using 16 known-good data and 33 known-bad or attack data, e.g., 6 longsaw, 8 sawdown-polymer-extruder, 4 sawdown-fiber-extruder, 2 singledrop, 3 slopedown, 10 z-increment. This resulted in a training set with 120 known-good data points and 33×16 (528) known-bad points.

Example 2—Training Models with a Single Attack Type

The 3D printer is a device that precisely controls an array of actuators in concert and within very tight tolerances. Because of this, any deviation in the functional behavior of one component generally results in detectable variation in the behavior of others. For this example, a single attack type, e.g., the sawdown-polymer attack, was used as a representative attack for training.

About 16 known-good or baseline data files and 11 sawdown temperature attack relevant data files were used to build the training set for this example. A total of 120 ((16×15)/2=120) non-repeated $P_S$ data points were obtained for each signal feature, e.g., X-axis, Y-axis, etc., by processing all unique known-good/known-good file combinations in the sample set. Similarly, 176 (16×11=176) $P_S$ data points from known-good and known-bad data files were obtained for the same features. This training data was used to train the logistic regression-based Bayesian model.

Feature Evaluation using Cross Validation Method

To evaluate the efficacy of the models that are developed using the signal feature, e.g., X-axis, Y-axis, etc., cross validation can be performed. Stratified K-fold cross validation method can be used for this purpose. The training data includes 120 known-goods and 528 known-bads as described previously. The stratified K-fold method splits the input training data into K partitions, and a value of K=3 can be used for the evaluations. Of these K partitions one partition can be used as a test dataset, while all the other remaining parts can be used to train the model. This process of training on K-1 partitions and testing on one partition is performed K times and each time a different partition of the K partitions is picked for testing.

Table 5 provides the precision or accuracy observed on all the listed single feature models.

TABLE 5

| Model | (K = 1) | (K = 2) | (K = 3) | Mean |
|---|---|---|---|---|
| X-axis | 91.6 | 92.6 | 92.6 | 92.3 |
| Y-axis | 91.6 | 96.2 | 93.9 | 93.9 |
| Z-axis | 93.0 | 91.2 | 87.5 | 90.5 |

TABLE 5-continued

| Model | (K = 1) | (K = 2) | (K = 3) | Mean |
|---|---|---|---|---|
| Heat-PWM | 87.5 | 90.2 | 87.9 | 88.5 |
| Fiber-Ext | 81.5 | 81.5 | 81.5 | 81.5 |
| Polymer-Ext | 81.5 | 81.5 | 81.5 | 81.5 |

Figure 6B:
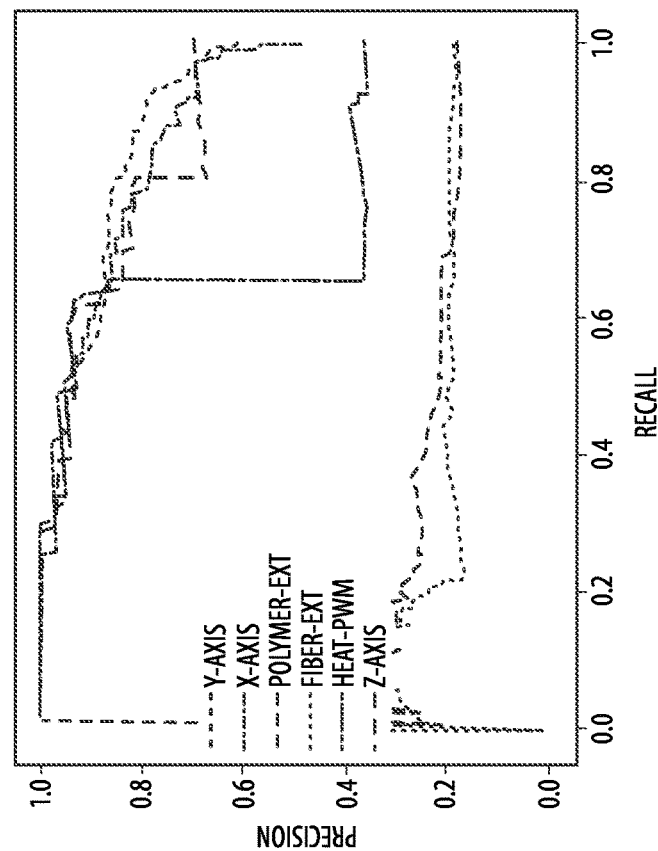
FIG. 6A-B illustrates single model receiver operator characteristic and precision-recall curves.
Figure 6A:
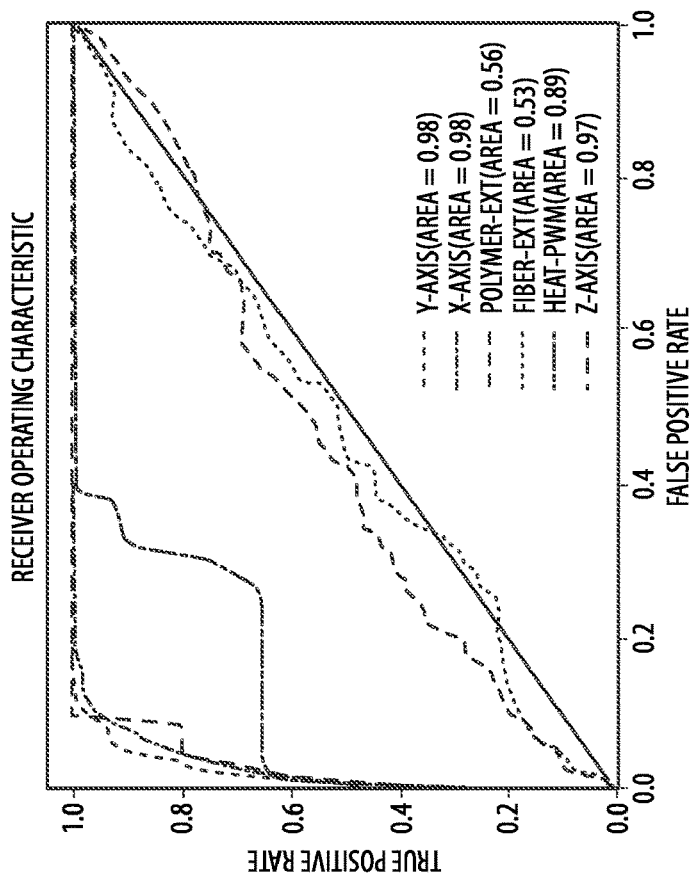

As shown in FIGS. 6A-B, calculating the Receiver Operating Characteristic (ROC) and precision-recall curves for the single-feature models shows the inefficiency and hence unreliability of models based on polymer-ext and fiber-ext datasets.

Figure 7A:
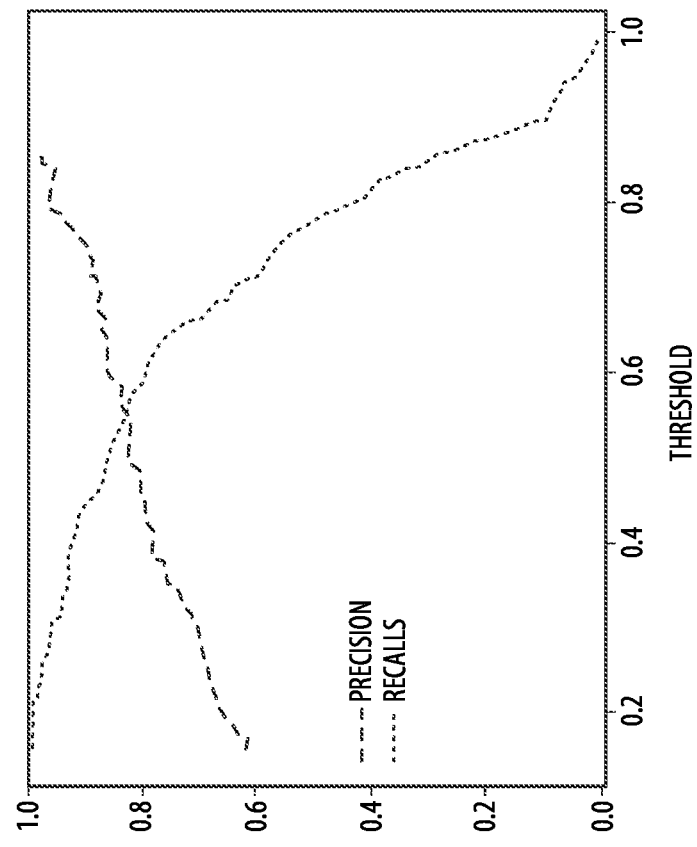
FIG. 7A-D illustrates precision-recall curves for various different probabilistic attack detection models based on different attacks.
Figure 7B:
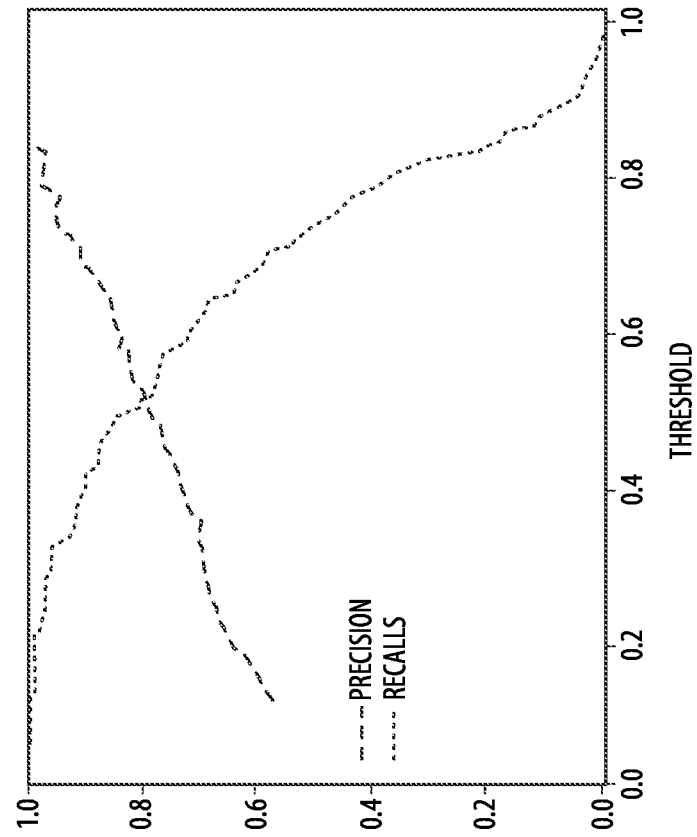
Figure 7C:
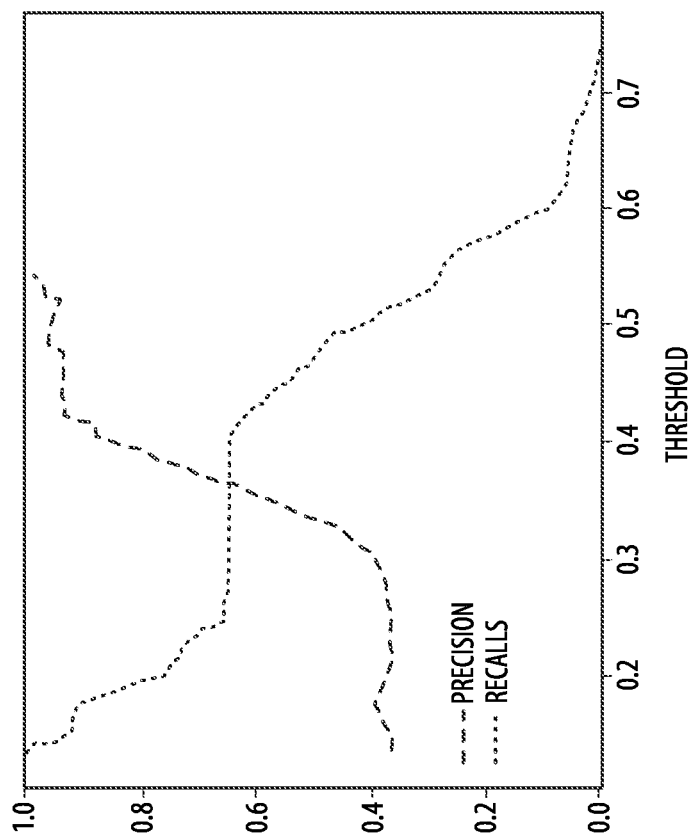
Figure 7D:
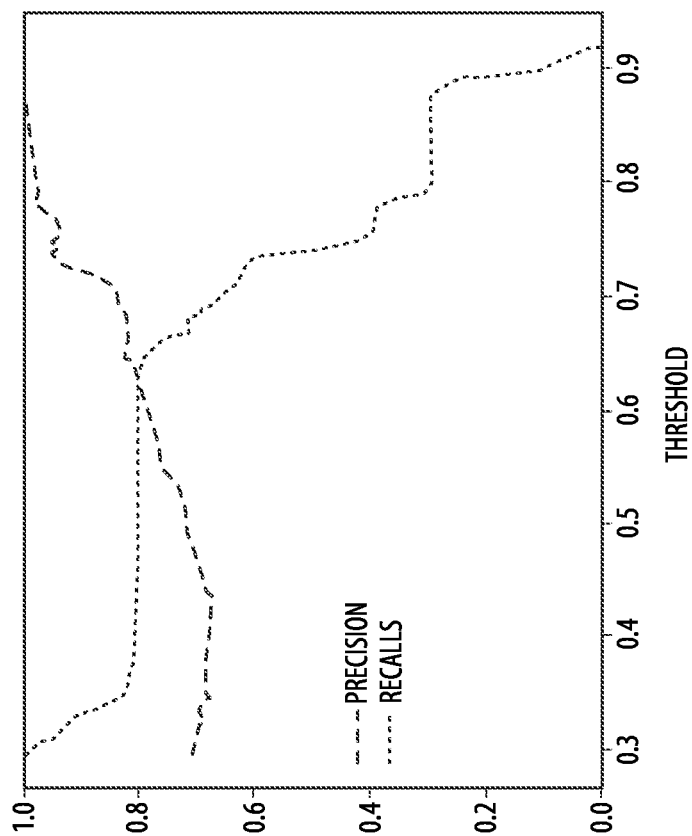

However, X-, Y-, Z-axis, and Heat-PWM datasets demonstrate good recall. In FIG. 7A, FIG. 7B, FIG. 7C and FIG. 7D a decision threshold value for the good models based on X-axis, Y-axis, Z-axis and Heat-PWM datasets, respectively is shown. More specifically, FIGS. 7A-D illustrate precision and recall values versus decision threshold values. FIG. 7A shows the precision and recall values for the X-axis model and that an optimal decision threshold value is about 0.5 (where the precision and recall values cross), which is selected for use in classification of X-axis data. FIG. 7B shows precision and recall values versus the decision threshold for the Y-axis model. It shows the optimal decision threshold value is between 0.5 and 0.6. In the current example, 0.5 is used as the decision threshold. FIG. 7C shows precision and recall values versus the decision threshold for Z-axis model. It shows an optimal decision threshold value over 0.6. In this example, 0.65 is used as the decision threshold for the Z-axis model. FIG. 7D shows precision and recall values versus the decision threshold for heat-PWM model. It shows the optimal threshold value at about 0.4, which can be used for classification.

Attack Detection Using Probabilistic Model Inference

To test inference, held-out known-good and known-bad samples can be used, e.g., representing all attack types, as inputs. The stealthy attack detection model reflects Eq. 2, where the α and β parameters have been trained with an MCMC sampling process.

The phase synchronous signal is calculated from the test data and a representative known-good training data sample, and a point-value mean is obtained. This mean value is used as an input x in the logistic function, which calculates a score between 0.0 and 1.0 The test side-channel data point is categorized as good, if the mean value is ≥threshold, or bad if it is <threshold, suggesting an attack. In this exemplary embodiment, the threshold values are obtained from the precision- and recall-based analysis discussed above in connection with FIGS. 7A-D.

In the current exemplary embodiment, the held-out test dataset includes 28 data files containing all attack types, including known-good/no attack. Out of these 28 files, 5 are baseline data files, 5 are of longsaw-polymer block attack data files, 2 are slopedown polymer block attack data files, 3 are sawdown fiber block attack data files, 5 are sawdown polymer block attack data files, 6 are z-axis increment attack and 2 are singledrop polymer block attack.

Figures 8A, 8B:
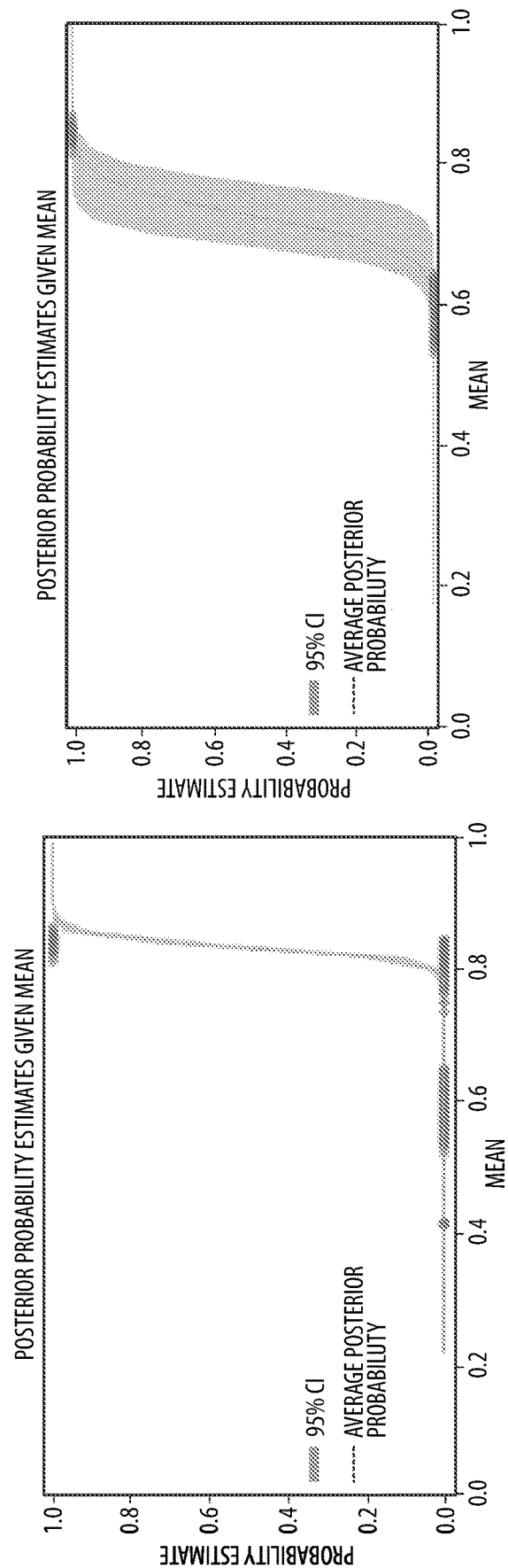
FIG. 8A-B illustrates Markov chain Monte Carlo training distributions for two different examples.

FIG. 8A shows that the resulting logistic curve for a model trained with data samples from all attack types. FIG. 8B shows a resulting logistic curve for another model trained with data samples from a single attack type.

Results for Example 1

Figure 9B:
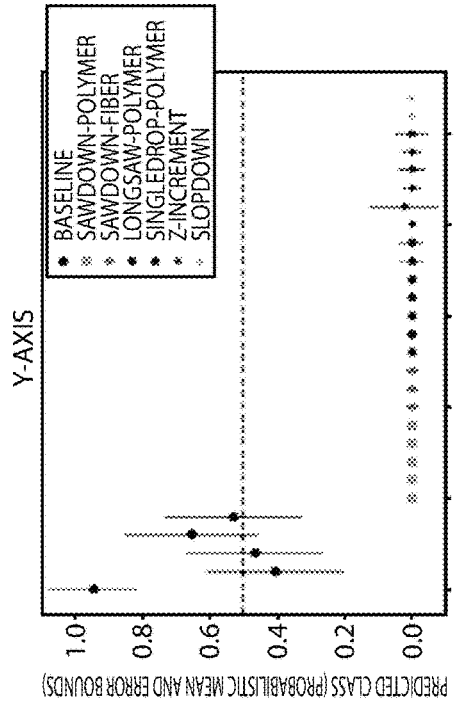
FIG. 9A-D illustrates class prediction with probabilistic mean and error bounds for various test cases for the model trained on different attacks.
Figure 9A:
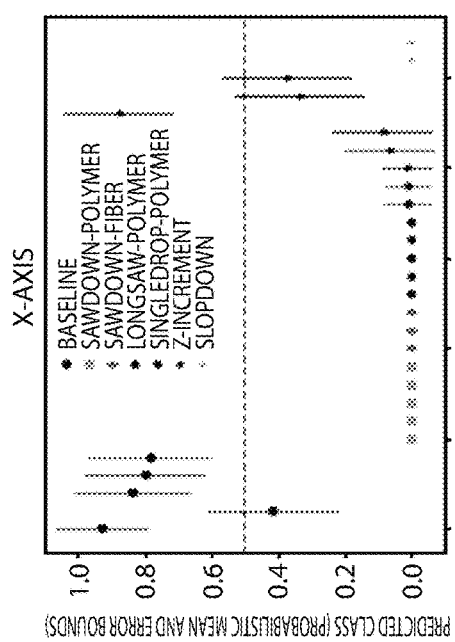
Figure 9D:
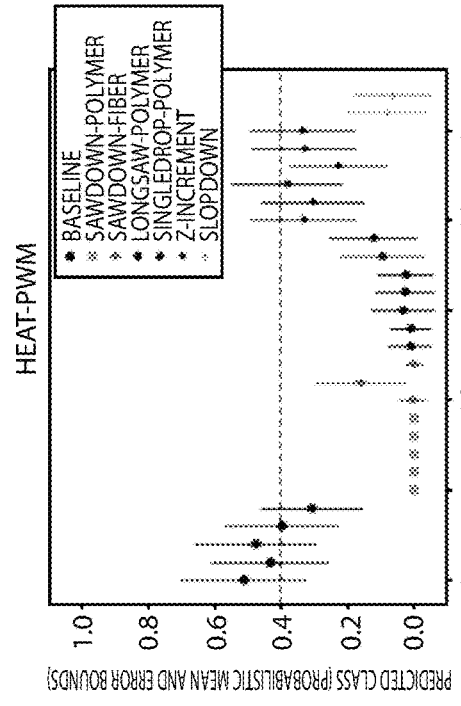
Figure 9C:
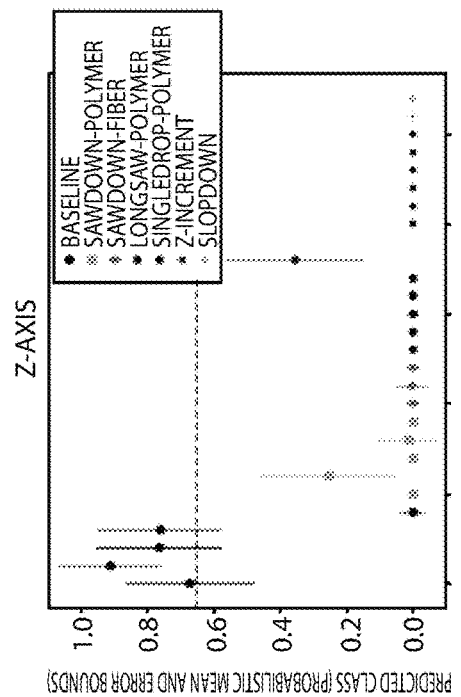

The FIG. 8A logistic curve exhibits a narrow 95% confidence interval. This behavior especially pertains to the classification of the known-good data, which performs poorly, e.g., a much larger standard deviation, when compared to previous models in FIGS. 9A-D. FIG. 9A illustrates test results on held out data using a model built using X-axis motor signals. FIG. 9B illustrates test results on held out data using Y-axis motor signals. FIG. 9C illustrate test results on held out data using Z-axis signals. FIG. 9D illustrate test results on held out data using Heat-PWM signals.

The two extruder motors were unable to achieve sufficient separation between the two distributions to perform accurate classification. The Heat-PWM signal achieved decent results for the temperature-based attacks, although the accuracy worsened as these attacks became more subtle or were singledrop. Despite this, it completely failed to distinguish between the known-good and z-increment attacks. This is unsurprising, e.g., the Heat-PWM channel is input-only, but raises the question of the most effective way to group data from multiple attacks during training. The composition of the known-good and known-bad classes effects the convergence behavior of the MCMC sampling process. By including the z-increment data with the temperature attacks, our Bayesian model may have produced a much thinner distribution than it otherwise would have, but this dynamic is not well-understood for our context and bears further investigation.

In the first example, the attack detection system successfully detects most attack deviations with the positional actuators: X-axis, Y-axis, and Z-axis motors' signals. The biggest surprise was the Z-axis motor, with performance that is nearly identical to the single-attack-trained model.

With multiple single feature models, detect and correct classification of all the attacks is achieved. The classification may be improved further by, for example, a simple averaging of the values predicted by the models, which can bias the classification towards the right direction. In general, this is most suitable for results in which all the models being aggregated have been trained with similar label categories. Aggregating results from single-attack-trained models may dilute divergent results and compromise the unique position of each data sensor.

Results for Example 2

For this example, the resulting logistic curve, shown in FIG. 8B, shows a larger confidence interval, indicating better class separation and a higher likelihood of correct known-good data classification.

Figure 10B:
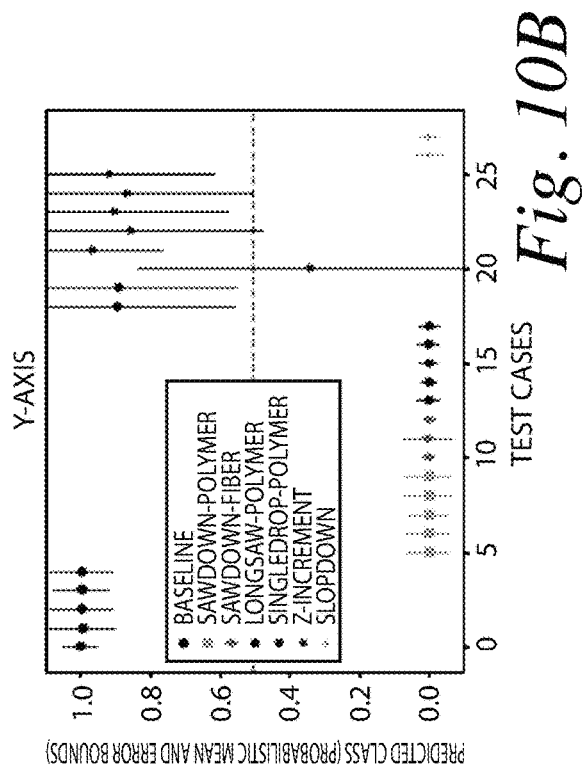
FIG. 10A-D illustrates class prediction with probabilistic mean and error bounds for various test cases for the model trained on one attack.
Figure 10D:
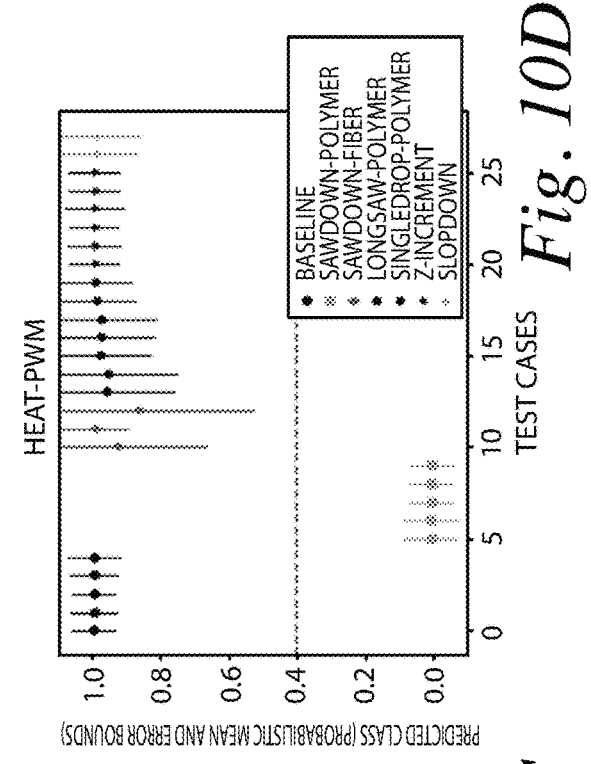
Figure 10A:
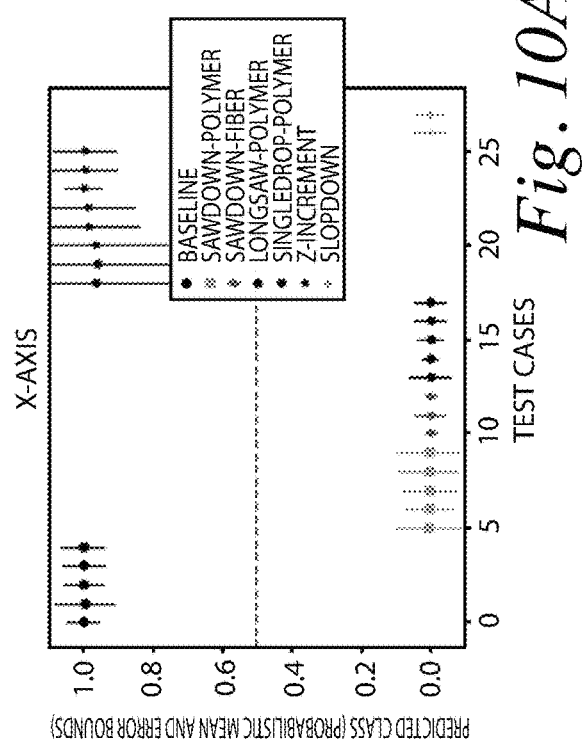
Figure 10C:
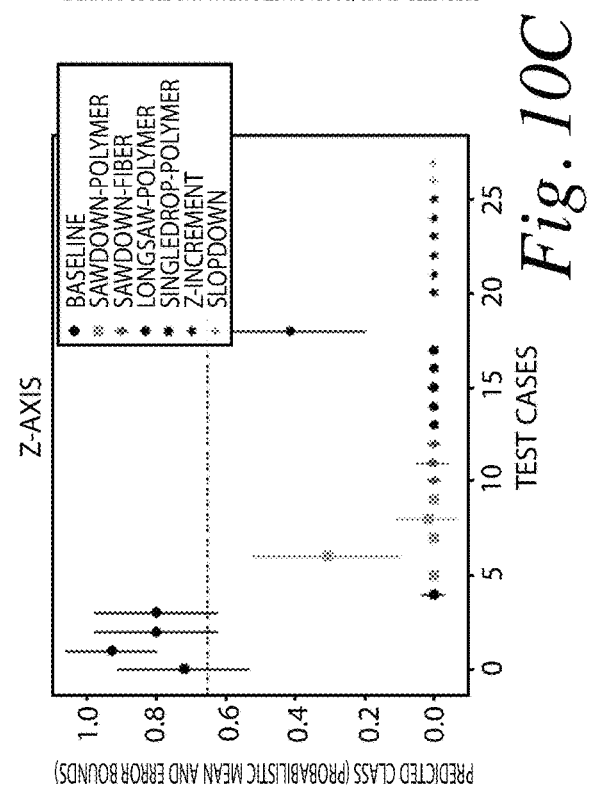

With most of the attack directed towards the polymer block, expectation is that the side-channel signals corresponding to the printhead subsystem would be able to successfully identify the attacks. However, the signals from both the polymer extruder and fiber extruder motors were unable to detect the attack. The results from the Heat-PWM channel FIG. 10D successfully labeled the sawdown-polymer test data but misclassified all the other attacks. FIG. 10A illustrates results on held out data using a model built using X-axis motor signals. FIG. 10B illustrates results on held out data using Y-axis motor signals. FIG. 10C illustrates results on held out data using Z-axis signals. FIG. 10D illustrates results on held out data using Heat-PWM signals.

Surprisingly, the best classification results came from the X-, Y-, and Z-axis motors, as shown in FIG. 10A-C. Based on training with the sawdown-polymer data, the X- and Y-axes successfully classified all but the singledrop-polymer temperature attacks, while the Z-axis was able to properly classify all but two of the attack data samples with high confidence.

These results suggest that subtle variations in the behavior of one component affects the behavior of other components in the 3D printing process. This can be expected as each of these components functionally complement each other during the printing process.

FIG. 10A-D shows that the data corresponding to one type of attack can be used to detect other similar attacks or different attacks. This is significant since the method learns the common underlying pattern of variations due to attacks or failures in the side-channel signals.

Performance

Training models are computationally expensive, and their runtime performance can significantly hinder their practical applications. Here, the compute intensive parts in the model training process and provide runtime performance metrics are discussed. For the performance evaluation task, it considers training all the six single feature models from the six side-channel data sources. In the training process, the pre-processing is the most time-consuming procedure. It can be sped up by performing parallel computing during this stage, for example, using Python's multiprocessing module.

Table 6 provides runtime performance numbers obtained from the two examples discussed above in connection with the two exemplary test platforms, System1 and System2.

TABLE 6

| System | Core Threads | I/O Read (seconds) | Pre-process (seconds) | Training (seconds) |
| --- | --- | --- | --- | --- |
| System1 | 36 | 4145.71 | 21231.31 | 1305.35 |
| System2 | 32 | 2081.55 | 8824.17 | 2405.5 |
|  | 64 | 1958.99 | 7433.48 | 2455.23 |
|  | 128 | 2073.43 | 6476.04 | 2412.91 |

The I/O-read and model training mostly remain unchanged with an increase in the processing cores. I/O reads in System2 with SSDs are almost 2× faster than disk reads. For pre-processing, speed increases of 18% and 36% are observed as the number of core threads increases from 32 to 64 and 128, respectively, in System2. There exist more opportunities for parallel computing, for example, in the pre-processing stage, computations can be performed on regions that are independent of each other.

Embodiments of the stealth attack system of the present disclosure address the problem of stealthy cyber anomaly detection in ALM processes by tracking the phase angle deviations of the side-channel signals. This has been demonstrated by having an industrial standard multi-material 3D printer, instrumented for electrical current signal collection, providing exemplary stealthy attacks, and collecting data to reflect nominal and compromised behavior. The system employs a trained Bayesian model to detect anomalies. Experiments using the stealth attack detection system can be performed to empirically demonstrate the feasibility of this novel approach to detecting cyber anomalies. Detection of an anomaly using the approach of the current embodiments does not necessarily require data or models from directly comparable cyber-attacks, although those would likely be beneficial for transfer learning or to prevent overfitting.

A related question concerns the necessity of labeled attack data for model training. While the Bayesian algorithm used was ostensibly developed for anomaly detection, the exemplary experiments were classification-based. This was mitigated somewhat in Experiment 1 by training with multiple attack types, however, a practical implementation that relies on attack simulation data may be difficult to use. By design, there is no real "standard" set of attacks to simulate. One-class classification may be the simplest approach, because maximum rates of deviation can be defined a priori and used to define a calibration routine. A Bayesian model, or something similar, may be beneficial, because phase angle is cyclic and one-dimensional.

Sample Flex Test Results

The stealthy attack detection system is discussed within the context of detecting creep and point attacks as model stealth attacks because: 1) the small instantaneous change would render them difficult to detect, and 2) the aggregate change would induce a measurable deviation in the mechanical performance of the printed part. That is, such attack may degrade the layer adhesion strength of the attacked test prints, and so result in premature delamination during flex that would negatively affect the yield strength or fracture behavior of the samples.

Figure 11:
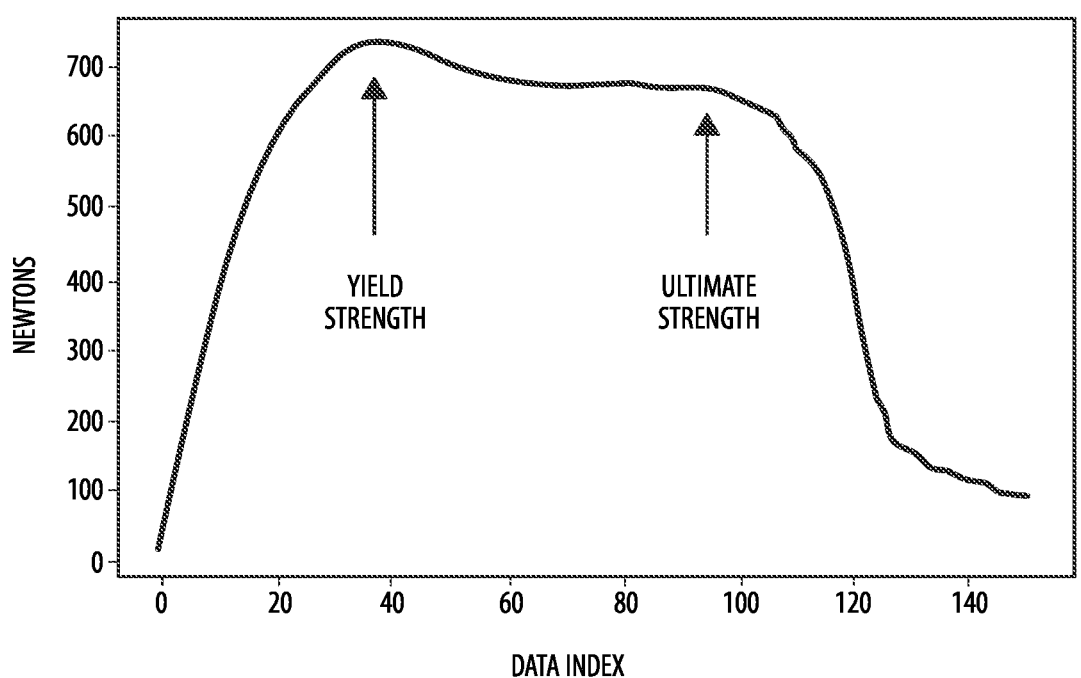
FIG. 11 illustrates average flexural strength curve for baseline samples.

To test this, a destructive 3-point flex test was performed on the samples with a Mark-10 M5-500 Force Gauge on an ES-30 manual test stand. Force was measured in Newtons and sampled at a rate of 10 Hz and yields an approximate flexural strength curve for each sample. FIG. 11 shows the averaged flexural strength curve for the baseline sample tests.

While a full treatment of composite stress-strain behavior is beyond the scope of the description herein, all of the sample flex tests yielded a similar bimodal curve, with a roughly linear stress-strain slope leading to a yield strength (YS) peak, a shallow trough as the sample deformed, and a secondary ultimate strength (US) peak immediately prior to fracture.

As noted above, the baseline samples were produced in two distinct tranches. Twenty-one initial samples were produced before any attack samples were run, and then ten more were produced roughly one year later to show the effects of machine wear-and-tear. The results here use ten of the "early" baseline and all ten "late" baseline samples and will henceforth be denoted with separate subscripts, e.g., 1 and 2, respectively.

Attack labels are sometimes accompanied with descriptors to denote the magnitude of the attack. For instance, the "longsaw-10" label indicates a per-layer temperature increment, e.g., 2° C., that requires ten layers to traverse from the minimum temperature value to the maximum value. Refer to Table 4 for a full description of the attack classes.

Table 7 shows the flex test results, as computed using the average curves of each class.

TABLE 7

| Label | count | YS Avg | YS Std Dev. | US Avg | US Std Dev. |
|---|---|---|---|---|---|
| Baseline (All) | 20 | 728.1 | 19.0 | 665.6 | 22.5 |
| Baseline-1 | 10 | 742.2 | 15.9 | 675.5 | 23.3 |
| Baseline-2 | 10 | 714 | 8.3 | 655.8 | 17.6 |
| Sawdown | 12 | 700.1 | 15.9 | 635.1 | 22.2 |
| Fiber Sawdown | 6 | 710 | 9.2 | 657.4 | 12.9 |
| Longsaw (All) | 14 | 712.9 | 6.5 | 653.4 | 17.6 |
| Longsaw-10 | 5 | 710.3 | 7.0 | 658.3 | 10.1 |
| Longsaw-20 | 5 | 716.1 | 6.7 | 665.2 | 13.3 |
| Longsaw-40 | 4 | 712.0 | 5.1 | 632.6 | 11.0 |
| Slopedown | 5 | 702.0 | 3.3 | 646.4 | 12.7 |
| SingleDrop | 5 | 710.1 | 6.6 | 652.5 | 9.5 |
| Z-inc (All) | 16 | 731.0 | 16.2 | 665.5 | 17.5 |
| Z-inc-0.05 | 5 | 720.3 | 18.8 | 671.3 | 20.4 |
| Z-inc-0.06 | 6 | 729.3 | 6.3 | 657.1 | 14.8 |
| Z-inc-0.07 | 5 | 743.8 | 15.0 | 669.8 | 16.9 |

The yield strength for each curve can be derived by finding the max of each vector, while the ultimate strength was derived by finding the max of each curve after vector index 90. For each average category, we mark the min and max values with red and blue text, respectively.

The results show that our attacks yielded modest changes in performance, with the largest coming from the more extreme temperature attacks. For instance, the "sawdown" category, where the temperature value alternated between max and min values for each layer, produced the largest reduction in yield strength, e.g., 4%, and the second largest reduction in ultimate strength, e.g., 4.5%.

None of the Z-axis increment attacks yielded significant reductions in strength; in fact, they increased sample stiffness in some cases. However, because the Z-axis attacks produced varying degrees of concave warping, this warping may have counteracted the induced drift of the attacks, at the expense of the print's dimensional stability.

These results illustrate the surprising difficulty of predicting an attack's effects with respect to a given print's geometry, material or materials, manufacturing technology, and environment, as well as the importance of empirical testing into the task of both the attacker and defender. Generating realistic attack scenarios requires a robust discipline of threat modeling, simulation, and experimentation.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. Memory encoding instructions that, when executed by data processing apparatus, cause the data processing apparatus to perform operations comprising:

accessing current and voltage signals indicative of instructions provided by controller circuitry of a 3D printer to actuators thereof based on a toolpath source, wherein subsets of the accessed current and voltage signals correspond to unaltered instructions and to instructions altered by malicious changes to the toolpath source;

retrieving respective phase signals from the current and voltage signals of the subsets;

determining phase synchrony metrics between the phase signals in a pair-wise manner, and associate, based on the phase synchrony metrics, a first class of signals with unaltered instructions and a second class of signals with altered instructions;

training, based on the determined phase synchrony metrics between the phase signals retrieved from the current and/or voltage signals indicative of instructions to at least some of the actuators, a Bayesian probabilistic model of logistic regression to define the boundary between the first class and the second class;

receiving a new current or voltage signal indicative of new instructions provided by the controller circuitry to one of the actuators; and predicting, based on the trained model, whether the new instructions are unaltered or altered.

2. The memory of claim 1, wherein the operation of training the model comprises performing a Monte Carlo Markov chain method to train parameters of the logistic regression.

3. The memory of claim 1, wherein the operation of retrieving respective phase signals from the current and voltage signals comprises applying a Hilbert Transform to each of the current and voltage signals.

4. The memory of claim 1, wherein the operation of determining phase synchrony metrics between the phase signals comprises, for each pair of phase signals,
producing a binary phase synchrony signal from the pair of phase signals, and
averaging the binary phase synchrony signal as the pair's phase synchrony metric.

5. The memory of claim 1, wherein the operations further comprise synchronizing the accessed current and voltage signals with each other.

6. The memory of claim 1, wherein the operations further comprise decimating the accessed current and voltage signals.

7. The memory of claim 1, wherein the operation of training the model is performed based on the determined phase synchrony metrics between the phase signals retrieved from the current and voltage signals indicative of instructions to at least two of the actuators.

8. The memory of claim 1, wherein the operation of training the model is performed based on the determined phase synchrony metrics between the phase signals retrieved from the current signals or voltage signals indicative of instructions to a single one of the actuators.

9. The memory of claim 8, wherein the new current signal or the new voltage signal is indicative of new instructions provided by the controller circuitry to one of the actuators that is different from the single actuator used for the training operation.

10. The memory of claim 1, including
collecting raw nominal data, raw baseline data, and raw attack data;
filtering the raw nominal data, raw baseline data, and raw attack data with a band-pass filter;
calculating instantaneous phase of the raw nominal data, raw baseline data, and raw attack data;
calculating baseline:baseline phase synchrony;
calculating baseline:attack phase synchrony; and
performing Monte Carlo Markov Chain logistic curve optimization.

11. The memory of claim 1, wherein the operations further comprise
accessing a threshold probability value;
predicting the new instructions are altered in response to a probability value that meets or exceeds the threshold probability value, labeling the new instructions as altered, and causing a warning to be presented in a user interface.

12. The memory of claim 1, wherein the operations further comprise
accessing a threshold probability value;
predicting the new instructions are unaltered in response to a probability value that is below the threshold probability value and labeling the new instructions as unaltered.

13. A system comprising:
a 3D printer comprising
actuators, and
a controller configured to provide instructions to the actuators based on a toolpath file;
respective current and voltage sensors arranged and configured to issue current and voltage signals indicative of the instructions provided by the controller to the actuators;
a data processing apparatus; and
the memory of claim 1.

14. The system of claim 13 wherein the actuators include an x-axis motor, y-axis motor, z-axis motor, polymer extruder motor, and fiber extruder motor, and a polymer heatblock.

15. The system of claim 13, wherein the 3D printer comprises
the data processing apparatus, and
the memory.

16. The system of claim 13, comprising:
a display module communicatively coupled with the data processing apparatus and configured to present a warning.

17. A method of detecting stealth additive manufacturing attacks altering g-code instructions during additive manufacturing, the method comprising:
providing additive manufacturing equipment configured to generate additively manufactured parts, the additive manufacturing equipment including a controller for controlling operation of the additive manufacturing equipment and at least one driver for controlling operation of an additive manufacturing component;
providing a stealth attack detection system;
clamping a Hall effect sensor to, at one end, a lead between the driver and the additive manufacturing component and, at the other end, the stealth attack detection system;
receiving, at the stealth attack detection system, an operation current signal indicative of operational additive manufacturing instructions provided by the controller to the additive manufacturing component; and
predicting, based on a trained probabilistic attack detection model, whether the new instructions are unaltered or altered.

18. The method of detecting stealth additive manufacturing attacks of claim 17 further including training the probabilistic attack detection model, wherein the training includes:
collecting, in the stealth attack detection system, current data signals indicative of instructions provided by the controller to the additive manufacturing component based on a toolpath source, wherein subsets of the collected current signals correspond to unaltered instructions and subsets of the collected current signals correspond to instructions altered by malicious changes to the toolpath source;

determining, with the stealth attack detection system, respective phase signals from the current signals of the subsets;

determining phase synchrony metrics between the phase signals in a pair-wise manner, and associating, based on the phase synchrony metrics, a first class of signals with unaltered instructions and a second class of signals with altered instructions;

training, based on the determined phase synchrony metrics between the phase signals retrieved from the current signals indicative of instructions to the additive manufacturing component, a Bayesian probabilistic model of logistic regression to define the boundary between the first class and the second class.

19. The method of detecting stealth additive manufacturing attacks of claim 17 including retrofitting additive manufacturing equipment with the stealth attack detection apparatus.

20. The method of detecting stealth additive manufacturing attacks of claim 17 including integrating the stealth attack detection apparatus into the additive manufacturing equipment.

* * * * *